United States Patent Office 2,980,677
Patented Apr. 18, 1961

2,980,677

NEW PYRAZOLO-PYRIMIDINES

Jean Druey, Riehen, and Paul Schmidt, Therwil, Basel Land, Switzerland, assignors to Ciba Pharmaceutical Products Inc., Summit, N.J.

No Drawing. Filed June 20, 1957, Ser. No. 667,042

Claims priority, application Switzerland July 16, 1956

9 Claims. (Cl. 260—256.4)

This invention relates to new pyrazolo-pyrimidines and a process for making same. More particularly, the invention concerns 1-iso-propyl-pyrazolo(3,4-d)pyrimidines of the formula

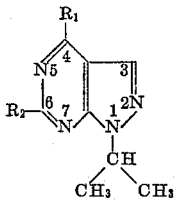

in which $R_1$ represents a free or substituted amino or mercapto group, a substituted hydroxyl group or a halogen atom, and $R_2$ has the same meaning or represents hydrogen, and salts thereof.

The substituted amino groups are mono- or di-substituted especially by one or two lower hydrocarbon radicals, whereby the hydrocarbon radicals may be interrupted also by hetero atoms, such as oxygen, nitrogen or sulfur. Lower mono- or dialkylamino groups, such as methylamino, dimethylamino, ethylamino or diethylamino groups and the furfurylamino group may be especially mentioned.

A substituted mercapto or hydroxyl group is more especially a lower alkylmercapto or lower alkoxy group, such as the methylmercapto or methoxy group. Halogen atoms are more especially chlorine, bromine or iodine.

The new compounds have valuable pharmacological effects; above all they dilate the coronary arteries and are diuretic. Accordingly, they can be used as medicaments. They are also useful as intermediates for the preparation of medicaments.

Especially useful are 3,5,6 and 7-unsubstituted 1-iso-propyl-pyrazolo(3,4-d)pyrimidines having in 4-position one of the aforementioned substituents, preferably an amino group and primarily the 1-isopropyl-4-amino-pyrazolo(3,4-d)pyrimidine of the formula

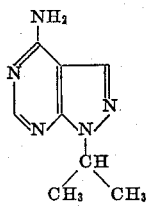

and salts thereof.

The new compounds are obtained when 2-isopropyl-3-amino-pyrazole-4-carboxylic acid and a carboxylic acid having only 1 carbon atom are reacted together in the form of their functional derivatives or the free acids, care being taken that at least one of the two carboxyl groups in the reaction participants contains an unsubstituted amino group, and in the resulting pyrazolo-pyrimidines free nuclear hydroxyl groups are substituted or replaced directly or stepwise by free or substituted amino or mercapto groups or halogen atoms.

For the reaction with the aminopyrazoles there are used primarily functional derivatives of formic acid or carbonic acid, such as for example formamide, urea, thiourea, guanidine, or if the functionally converted carboxyl group of the pyrazole compound contains an unsubstituted amino group, such as for example in the amide, thioamide or amidine grouping, a halogen formic acid ester or a carbonic acid dihalide, for example, chloroformic acid ester or phosgene. Functional derivatives of the amino-pyrazole-4-carboxylic acid are, for example, esters, amides, thioamides, amidines or the nitrile.

The condensation of the aminopyrazoles to the pyrazolo-pyrimidines takes place advantageously at temperatures above 100° C., if desired in the presence of diluents and/or condensing agents in an open or closed vessel.

The conversion of nuclear hydroxyl groups takes place in the customary manner, preferably by halogenation, for example with halides of phosphoric acid, such as phosphorus oxychloride or phosphorus pentachloride, or the corresponding bromides, and, if desired, by subsequently exchanging the halogen atoms for free or substituted amino or mercapto groups or substituted hydroxyl groups, advantageously by treatment with ammonia or hydrogen sulphide or the corresponding amines, mercaptans or alcohols, the hydrogen sulfide or the alcohols or mercaptans being used with advantage in the form of their metal compounds or in presence of condensing agents. Instead of hydrogen sulfide, thiourea or other agents yielding hydrogen sulfide may be used with advantage. Free nuclear hydroxyl groups can also be replaced directly by mercapto groups, e.g. by treatment with sulfurizing agents, such as phosphorus pentasulfide.

Depending on the nature of the substituents present in the products they may be converted into various kinds of salts. When they contain free mercapto groups they can be converted into metal salts, e.g. by dissolving in a solution of alkali. Compounds of basic character, such as those containing basic substituents form therapeutically useful acid addition salts with inorganic or organic acids such as hydrohalic acids, sulfuric acid, phosphoric acid, nitric acid, perchloric acid; aliphatic, alicyclic, aromatic or heterocyclic carboxylic acids or sulfonic acids, such as formic acid, acetic acid, propionic acid, oxalic acid, succinic acid, glycollic acid, lactic acid, malic acid, tartaric acid, citric acid, ascorbic acid, hydroxymaleic acid, dihydroxymaleic acid or pyruvic acid; phenylacetic acid, benzoic acid, p-aminobenzoic acid, anthranilic acid, p-hydroxybenzoic acid, salicylic acid or p-aminosalicylic acid; methane-sulfonic acid, ethane-sulfonic acid, hydroxyethane-sulfonic acid, ethylene-sulfonic acid; toluene sulfonic acid, naphthalene sulfonic acid or sulfanilic acid.

In the above process it is of advantage to use starting materials which lead to the pyrazolopyrimidines indicated above as being especially valuable.

The 2-isopropyl-3-aminopyrazoles, which are unsubstituted in 5-position and contain in 4-position a free or functionally converted carboxyl group, used as starting materials are obtained, for example, by reacting α-cyano-β-formyl-acetic acid or functional derivatives thereof, such as esters, amidines, amides or the nitrile and/or enol ethers, acetals or mercaptals with isopropyl hydrazine. As functional derivatives of α-cyano-β-formyl-acetic acid there are used preferably enol ethers of α-cyano-β-formyl-acetic acid esters, such as for example, the ethoxymethylene cyanoacetic acid ethyl ester. The condensation to form the pyrazoles takes place under mild conditions, partly at room temperature; it is an exothermic reaction. It is also possible to carry out the operation at a raised temperature and in the presence of a condensing agent, such as for example, in the presence of an acid. The presence of a diluent, such as an alcohol, toluene or chloroform, is of advantage. In the resulting 3-aminopyrazoles the free or functionally converted carboxyl group can be further converted in the usual manner.

The aforementioned pyrazolopyrimidines, their salts or mixtures thereof can be used, for example, in the form of pharmaceutical preparations. These preparations contain the said compounds in admixture with a pharmaceutical organic or inorganic carrier material suitable for enteral, parenteral or local application. For the production of these preparations such substances are concerned as do not react with the new compounds, as for example water, gelatine, lactose, white petroleum jelly, starch, magnesium stearate, talc, vegetable oils, benzyl alcohols, gums, polyalkylene glycols, cholesterol or other known medicament carriers. The pharmaceutical preparations can take the form, for example, of tablets, dragees, or are in liquid form as solutions, suspensions or emulsions. They may be sterilized and/or contain auxiliary substances, such as preservatives, stabilizing, wetting or emulsifying agents. They may also contain other therapeutically valuable substances. The pharmaceutical preparations are formulated by the usual methods.

The following examples illustrate the invention:

Example 1

19.7 grams of 2-isopropyl-4-carbethoxy-3-aminopyrazole are heated for 4 hours in a bath having a temperature of 200–210° C. with 50 grams of formamide. After cooling, the reaction mixture is taken up in 2 N-caustic soda solution, treated with animal charcoal, and the product precipitated by adjusting the pH to 3 with 2 N-hydrochloric acid. There is obtained 1-isopropyl-4-hydroxypyrazolo(3,4-d)pyramidine of the formula

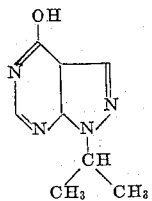

in the form of crystals melting at 197–198° C.

7.3 grams of this product are heated to the boiling temperature for 5 hours with 40 cc. of phosphorus oxychloride. The phosphorus oxychloride is evaporated, the residue put into ice-water, the pH adjusted to 8 with 2 N-caustic soda solution, and the mixture extracted with ether. The ether is evaporated and the residue recrystallized from petroleum ether to obtain 1-isopropyl-4-chloropyrazolo(3,4-d)pyrimidine of the formula

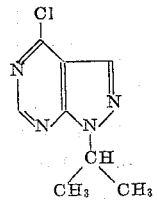

in the form of white crystals of melting point 53° C.

The 2-isopropyl-4-carbethoxy-3-amino-pyrazole used as starting material can be prepared as follows:

8.2 grams of isopropylhydrazine are introduced into a solution of 16.9 grams of ethoxymethylene cyanoacetic acid in 100 cc. of alcohol and heated at the boiling temperature for 12 hours. The mixture is then evaporated to dryness under reduced pressure and the residue distilled in vacuo. 2-isopropyl-3-amino-4-carbethoxypyrazole of the formula

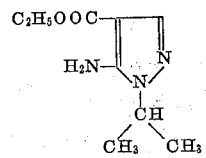

passes over at 164–166° C. under a pressure of 10 mm. and solidifies in crystalline form in the receiver. The colorless crystals obtained melt between 46 and 48° C.

Example 2

9 grams of 1-isopropyl-4-chloro-pyrazolo(3,4-d)pyrimidine and 50 cc. of liquid ammonia are heated at 100° C. for 5 hours in a sealed tube. After evaporation of the liquid ammonia there remains a white product which is extracted with methylene chloride. After evaporation of the latter the residue is recrystallized from cyclohexane. The resulting 1-isopropyl-4-amino-pyrazolo(3,4-d)pyrimidine of the formula

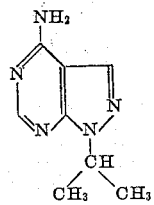

forms white crystals of melting point 152–153° C.

Example 3

A solution of 10 grams of 1-isopropyl-4-chloro-pyrazolo(3,4-d)pyrimidine in 250 cc. of toluene is mixed with 10 grams of furfurylamine and then heated to the boiling temperature for 10 hours. The mixture is then evaporated to dryness, the residue mixed with 100 cc. of 1 N-caustic soda solution, and the alkaline suspension extracted with chloroform. The chloroformic extract is recrystallized from much petroleum ether. There is obtained in this manner 1-isopropyl-4-furfurylamino-pyrazolo(3,4-d)pyrimidine of the formula

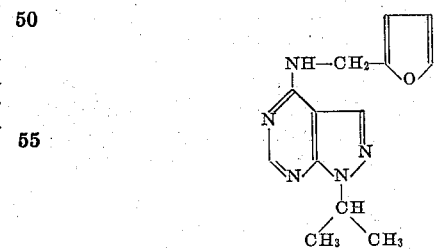

in the form of white crystals of melting point 140–141° C. By direct recrystallization of the chloroformic residue from alcoholic hydrochloric acid the hydrochloride of the above compound is obtained in the form of white crystals of melting point 183–184° C.

Example 4

10 grams of 1-isopropyl-4-chloro-pyrazolo(3,4-d)pyrimidine and 50 cc. of liquid methylamine are heated at 90–100° C. for 5 hours in a sealed tube. After evaporation of the liquid methylamine, the white residue is taken up in methylene chloride, and undissolved matter removed by filtration. The filtrate is evaporated and the residue crystallized from much petroleum ether. 1- isopropyl - 4 - methylamino-pyrazolo(3,4-d)pyrimidine of the formula

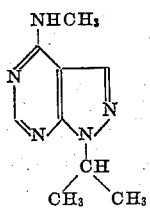

is obtained in the form of white crystals of melting point 96–97° C.

*Example 5*

9 grams of 1-isopropypropyl-4-chloro-pyrazolo(3,4-d) pyrimidine are introduced into a solution prepared from 1.2 grams of sodium and 200 cc. of methanol. The whole is boiled for 3 hours. After cooling, the precipitated sodium chloride is filtered off, and the filtrate is evaporated to dryness in vacuo. The residue is recrystallized from petroleum ether. There is obtained 1-isopropyl-4-methoxy-pyrazolo(3,4-d)pyrimidine of the formula

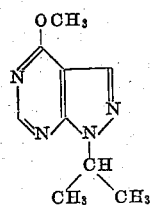

in the form of white crystals of melting point 65–66° C.

*Example 6*

10 grams of 2-isopropyl-3-amino-4-carbamyl-pyrazole and 20 grams of urea are mixed well and heated for one hour in a bath at 200° C. The hot melt is then poured into 150 cc. of 1 N-caustic soda solution, treated with animal charcoal and suction-filtered. The pH of the filtrate is adjusted to 3 with hydrochloric acid, whereupon white crystals separate. By recrystallizing the precipitate from water there is obtained 1-isopropyl-4:6-dihydroxy-pyrazolo(3,4-d)-pyrimidine of the formula

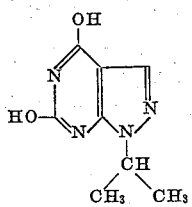

in the form of white crystals melting at 286–287° C. (with decomposition).

10 grams of 1-isopropyl-4:6-dihydroxy-pyrazolo(3,4-d) pyrimidine and 140 cc. of phosphorus oxychloride are heated together in a sealed tube for 15 hours at 160° C. A little undissolved matter is removed by filtration with suction. The phosphorus oxychloride is evaporated under reduced pressure, the residue is extracted with chloroform, the chloroformic solution is washed with water and the chloroformic residue crystallized from a very little petroleum ether. There is obtained 1-isopropyl-4:6-dichloro-pyrazolo(3,4-d)pyrimidine of the formula

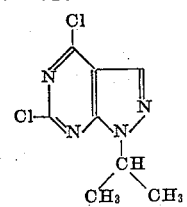

in the form of yellowish crystals melting at 67–68° C.

The starting material is prepared as follows:

30 grams of isopropyl-hydrazine are added to a solution of 48.8 grams of ethoxymethylene-malonitrile in 500 cc. of alcohol. The whole is then heated for 10 hours at the boil, evaporated to dryness under reduced pressure and crystallized from much isopropyl ether. There is obtained 2-isopropyl-3-amino-4-cyanopyrazole in the form of white crystals melting at 94–95° C. 10 grams of this compound are mixed with 200 cc. of 2 N-caustic soda solution and 100 cc. of alcohol, and the solution heated for 3 hours at the boil. The alcohol is evaporated under reduced pressure, the residue is allowed to cool and the precipitate filtered. The latter is recrystallized from alcohol. There is obtained 2-isopropyl-3-amino-4-carbamyl-pyrazole of the formula

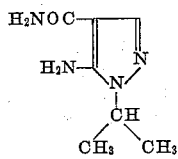

in the form of white crystals melting at 215–216° C.

*Example 7*

7.7 grams of 1-isopropyl-4:6-dichloro-pyrazolo(3,4-d) pyrimidine are added to a solution prepared from 2.3 grams of sodium and 200 cc. of methanol. The whole is boiled for 6 hours. After cooling, the precipitated sodium chloride is filtered off, and the filtrate is evaporated to dryness under reduced pressure. The residue is recrystallized from petroleum ether and there is obtained 1 - isopropyl-4:6-dimethoxy-pyrazolo(3,4-d)pyrimidine of the formula

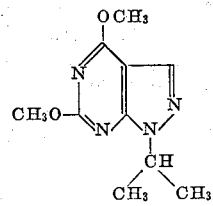

in the form of white crystals melting at 74–75° C.

*Example 8*

10 grams of 1-isopropyl-4:6-dichloro-pyrazolo-(3,4-d) pyrimidine and 70 cc. of liquid ammonia are heated in a sealed tube for 6 hours at 100° C. After evaporation of the liquid ammonia there remains a solid product which is extracted with 150 cc. of water to separate off the ammonium chloride. The product which is sparingly soluble in water can be recrystallized from methylene chloride. There is obtained 1-isopropyl-4-amino-6-chloropyrazole (3,4-d)pyrimidine of the formula

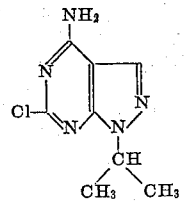

in the form of white crystals melting at 260–261° C.

*Example 9*

10 grams of 1-isopropyl-4:6-dichloro-pyrazolo-(3,4-d) pyrimidine and 70 cc. of liquid dimethylamine are heated for 5 hours at 100° C. in a sealed tube. After evaporation of the liquid dimethylamine a product remains which is recrystallized from petroleum ether. There is obtained 1-isopropyl-4:6-bis-dimethylamino-pyrazolo-(3,4-d)pyrimidine of the formula

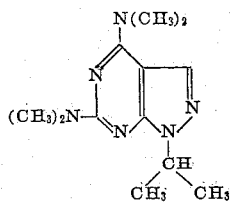

in the form of white crystals melting at 135–136° C. The compound forms a hydrochloride melting at 206–207° C.

*Example 10*

A solution of 9 grams of 1-isopropyl-4-chloro-pyrazolo(3,4-d)pyrimidine and 8.5 grams of thiourea in 150 cc. of alcohol is heated for 12 hours at the boil. The mixture is evaporated to 70 cc. under reduced pressure and then allowed to cool. 1-isopropyl-4-mercapto-pyrazolo-(3,4-d)pyrimidine of the formula

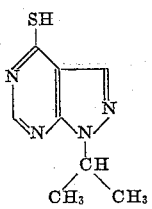

soon precipitates in the form of yellow crystals melting at 207–208° C.

*Example 11*

15.5 grams of 1-isopropyl-4-chloro-pyrazolo-(3,4-d)-pyrimidine and 50 cc. of liquid dimethylamine are heated for 5 hours at 100° C. in a sealed tube. After evaporation of the dimethylamine, the residue is dissolved in water, the pH is adjusted to 9 with 1 N-caustic soda solution and the residue extracted with chloroform. After evaporation of the chloroform there crystallizes 1-isopropyl-4-dimethyl-amino-pyrazolo(3,4-d)pyrimidine of the formula

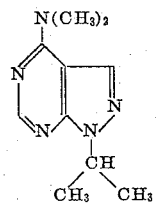

in the form of white crystals melting at 69–70° C. The hydrochloride melts at 239–241° C.

*Example 12*

18 grams of 1-isopropyl-4-chloro-pyrazolo(3,4-d)-pyrimidine and 50 cc. of liquid diethylamine are heated for 5 hours at 90–100° C. in a sealed tube. After evaporation of the diethylamine, the residue is taken up in water and the aqueous solution extracted with ether. The ethereal residue is a colorless oil. It is taken up in a alcoholic hydrochloric acid. On evaporating the solution, the hydrochloride of 1-isopropyl-4-diethylamino-pyrazolo(3,4-d)pyrimidine of the formula

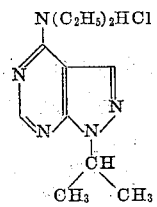

crystallizes in the form of white crystals melting at 165–167° C.

*Example 13*

10 grams of 1-isopropyl-4:6-dichloro-pyrazolo(3,4-d)-pyrimidine and 70 cc. of liquid monomethylamine are heated for 5 hours at 100° C. in a sealed tube. After evaporation of the liquid monomethylamine an oily residue remains in the tube which is taken up in benzene. The benzene residue is recrystallized from alcoholic hydrochloric acid. There is obtained the hydrochloride of 1-isopropyl-4:6-bis-monomethylamino - pyrazolo(3,4-d)-pyrimidine of the formula

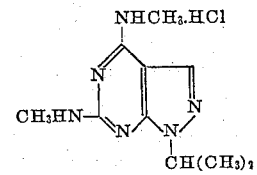

in the form of white crystals melting at 227–229° C.

*Example 14*

10 grams of 1-isopropyl-4:6-dichloro-pyrazolo(3,4-d)-pyrimidine and 70 cc. of β-diethylamino-ethylamine are boiled under reflux for 3 hours. The excess β-diethyl-aminoethylamine is distilled off in vacuo, the residue is taken up in 100 cc. of water, the pH adjusted to 9 with 2 N-caustic soda solution and the residue extracted with chloroform. The chloroformic residue is distilled at 210–225° C. under 0.2 mm. of pressure. There is obtained 1-isopropyly-4:6-bis(β-diethyl-amino - ethylamino)-pyrazolo(3,4-d)pyrimidine of the formula

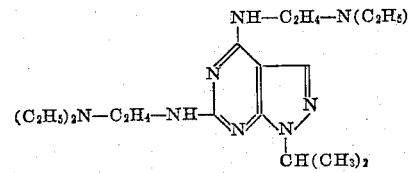

in the form of a viscous oil.

What is claimed is:
1. 1-isopropyl-4-methoxy-pyrazolo(3,4-d)pyrimidine.
2. A therapeutically useful acid addition salt of a compound claimed in claim 1.
3. 1-isopropyl - 4,6 - dimethoxy-pyrazolo(3,4-d)pyrimidine.
4. A therapeutically useful acid addition salt of a compound claimed in claim 3.
5. 1-isopropyl-pyrazolo(3,4-d)pyrimidines of the formula

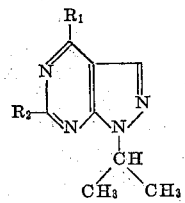

wherein $R_1$ represents a lower alkoxy group and $R_2$ represents hydrogen.

6. 1-isopropyl-pyrazolo(3,4-d)pyrimidines of the formula

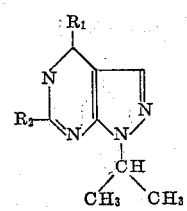

wherein $R_1$ represents a lower alkoxy group and $R_2$ represents halogen.

7. 1-isopropyl-pyrazolo(3,4-d)pyrimidines of the formula

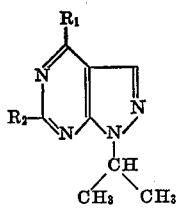

wherein $R_1$ represents a lower alkoxy group and $R_2$ represents a lower alkoxy group.

8. A therapeutically useful acid addition salt of a compound claimed in claim 5.

9. A therapeutically useful acid addition salt of a compound claimed in claim 7.

References Cited in the file of this patent
UNITED STATES PATENTS

| | | |
|---|---|---|
| 2,691,043 | Husted et al. | Oct. 5, 1954 |
| 2,802,005 | Heidelberger | Aug. 6, 1957 |

FOREIGN PATENTS

| | | |
|---|---|---|
| 716,327 | Great Britain | Oct. 6, 1954 |

OTHER REFERENCES

Rose: Jour. Chem. Soc. (London), pp. 3448–3454 (1952).

Abstracts of American Chemical Society, 128th meeting, pp. 11N–13N (1955).

Falco et al.: Journ. Amer. Chem. Soc., vol. 78, pages 3143–3145 (1956).

Robins: Jour. Amer. Chem. Soc., vol. 78, pages 784–788 (1956).

Schmidt et al.: Helvetica Chimica Acta, vol. 39, pp. 986–989 (1956).

UNITED STATES PATENT OFFICE

CERTIFICATE OF CORRECTION

Patent No. 2,980,677

April 18, 1961

Jean Druey et al.

It is hereby certified that error appears in the above numbered patent requiring correction and that the said Letters Patent should read as corrected below.

Column 3, line 35, for "pyrazolo(3,4-d)pyramidine" read -- pyrazolo(3,4-d)pyrimidine --; column 5, line 15, for "-isopropypropyl-" read -- -isopropyl- --; column 8, line 31, for "-isopropyly-4:6-bis($\beta$-" read -- -isopropyl-4:6-bis-($\beta$- --.

Signed and sealed this 5th day of December 1961.

(SEAL)

Attest:

ERNEST W. SWIDER
Attesting Officer

DAVID L. LADD
Commissioner of Patents

USCOMM-DC